United States Patent
Omae et al.

(10) Patent No.: US 11,955,630 B2
(45) Date of Patent: Apr. 9, 2024

(54) POSITIVE ELECTRODE ACTIVE MATERIAL AND BATTERY INCLUDING THE SAME

(71) Applicant: Panasonic Intellectual Property Management Co., Ltd., Osaka (JP)

(72) Inventors: Takanori Omae, Osaka (JP); Ryuichi Natsui, Osaka (JP); Issei Ikeuchi, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 594 days.

(21) Appl. No.: 17/165,953

(22) Filed: Feb. 3, 2021

(65) Prior Publication Data
US 2021/0193999 A1  Jun. 24, 2021

Related U.S. Application Data

(63) Continuation of application No. PCT/JP2019/017897, filed on Apr. 26, 2019.

(30) Foreign Application Priority Data

Sep. 5, 2018 (JP) .................. 2018-165571

(51) Int. Cl.
*H01M 4/505* (2010.01)
*C01G 45/12* (2006.01)
(Continued)

(52) U.S. Cl.
CPC ........ *H01M 4/505* (2013.01); *C01G 45/1228* (2013.01); *H01M 10/0525* (2013.01); *H01M 2004/028* (2013.01)

(58) Field of Classification Search
CPC ...................................................... H01M 4/505
See application file for complete search history.

(56) References Cited

U.S. PATENT DOCUMENTS

2006/0057466 A1* 3/2006 Suhara .................. H01M 4/582
429/322
2019/0088945 A1* 3/2019 Ceder ................ C01G 45/1228

FOREIGN PATENT DOCUMENTS

KR      20190024680 A  *  7/2018
WO      2014/007360        1/2014

OTHER PUBLICATIONS

International Search Report of PCT application No. PCT/JP2019/017897 dated Jul. 16, 2019.

* cited by examiner

*Primary Examiner* — Maria Laios
*Assistant Examiner* — Jordan E Berresford
(74) *Attorney, Agent, or Firm* — Rimon P.C.

(57) ABSTRACT

A positive electrode active material according to the present disclosure includes: a lithium composite oxide which includes Mn and at least one selected from the group consisting of F, Cl, and N, and S. The lithium composite oxide has a crystalline structure which belongs to the space group Fd-3m, and a relationship $1.40 \leq$ intensity ratio $I_{Mn1}/I_{Mn2} \leq 1.90$ is satisfied. The intensity ratio $I_{Mn1}/I_{Mn2}$ is a ratio of an intensity $I_{Mn1}$ to an intensity $I_{Mn2}$. The intensity $I_{Mn1}$ and the intensity $I_{Mn2}$ are intensities of a first proximity peak and a second proximity peak, respectively, of the Mn in a radial distribution function of the Mn included in the lithium composite oxide.

19 Claims, 1 Drawing Sheet

(51) Int. Cl.
*H01M 4/02* (2006.01)
*H01M 10/0525* (2010.01)

POSITIVE ELECTRODE ACTIVE MATERIAL AND BATTERY INCLUDING THE SAME

BACKGROUND

1. Technical Field

The present disclosure relates to a positive electrode active material and a battery including the same.

2. Description of the Related Art

International Publication No. 2014/007360 has disclosed a lithium composite metal oxide which includes Mn, Ni, and Li but not Co and which satisfies the following (a) and (b).

(a) In a radial distribution function obtained from an extended X-ray absorption fine structure (hereinafter, referred to as "EXAFS") spectrum at the K absorption edge of Mn, a ratio $I_{BMn}/I_{AMn}$ of an intensity IBM of a second proximity peak $B_{Mn}$ to an intensity $I_{AMn}$ of a first proximity peak $A_{Mn}$ is greater than or equal to 0.5 and less than or equal to 1.2.

(b) In a radial distribution function obtained from an EXAFS spectrum at the K absorption edge of Ni, a ratio $I_{BNi}/I_{ANi}$ of an intensity $I_{BNi}$ of a second proximity peak $B_{Ni}$ to an intensity $I_{ANi}$ of a first proximity peak $A_{Ni}$ is greater than or equal to 1.0 and less than or equal to 1.7.

SUMMARY

One non-limiting and exemplary embodiment provides a positive electrode active material which is to be used for a battery having a high capacity.

In one general aspect, the techniques disclosed here feature a positive electrode active material comprising: a lithium composite oxide which includes Mn and at least one selected from the group consisting of F, Cl, and N, and S. In the positive electrode active material described above, the lithium composite oxide has a crystalline structure which belongs to the space group Fd-3m, and the following formula (I) is satisfied.

$$1.40 \leq \text{intensity ratio } I_{Mn1}/I_{Mn2} \leq 1.90 \quad (I)$$

In the above formula (I), the intensity ratio $I_{Mn1}/I_{Mn2}$ is a ratio of an intensity $I_{Mn1}$ to an intensity $I_{Mn2}$, the intensity $I_{Mn1}$ is an intensity of a first proximity peak of the Mn in a radial distribution function of the Mn included in the lithium composite oxide, and the intensity $I_{Mn2}$ is an intensity of a second proximity peak of the Mn in the radial distribution function of the Mn included in the lithium composite oxide.

The present disclosure provides a positive electrode active material which realizes a battery having a high capacity. In addition, the present disclosure provides a battery including a positive electrode which includes the positive electrode active material described above, a negative electrode, and an electrolyte. The battery described above has a high capacity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
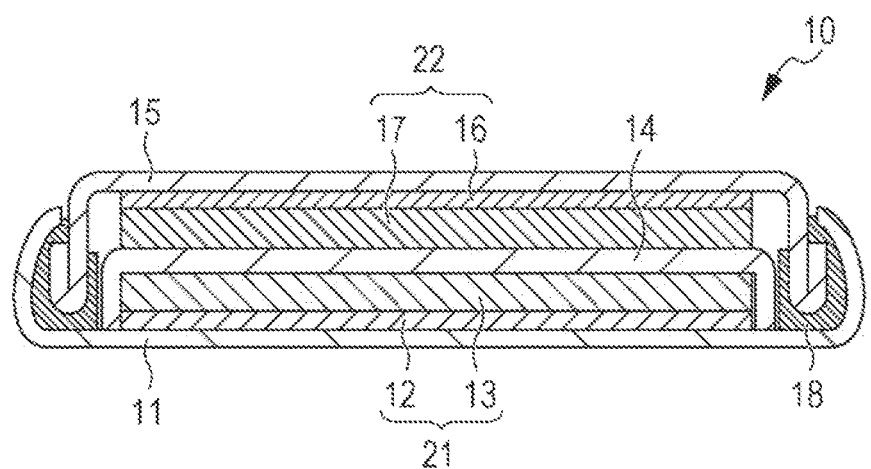
FIG. 1 is a cross-sectional view of a battery 10 according to Embodiment 2.

Hereinafter, embodiments of the present disclosure will be described.

Embodiment 1

A positive electrode active material according to Embodiment 1 includes a lithium composite oxide which includes Mn and at least one selected from the group consisting of F, Cl, N, and S. In the positive electrode active material described above, the lithium composite oxide has a crystalline structure which belongs to the space group Fd-3m, and the following formula (I) is satisfied.

$$1.40 \leq \text{intensity ratio } I_{Mn1}/I_{Mn2} \leq 1.90 \quad (I)$$

In the formula (I) described above, the intensity ratio $I_{Mn1}/I_{Mn2}$ is a ratio of an intensity $I_{Mn1}$ to an intensity $I_{Mn2}$, the intensity $I_{Mn1}$ is an intensity of a first proximity peak of the Mn in a radial distribution function of the Mn included in the lithium composite oxide, and the intensity $I_{Mn2}$ is an intensity of a second proximity peak of the Mn in the radial distribution function of the Mn included in the lithium composite oxide.

The positive electrode active material according to Embodiment 1 is used to improve a capacity of a battery.

A lithium ion battery including the positive electrode active material according to Embodiment 1 has a redox potential (with reference to Li/Li$^+$) of approximately 3.4 V.

The lithium composite oxide according to Embodiment 1 includes at least one element selected from the group consisting of F, Cl, N, and S. Since the at least one element selected from the group consisting of F, Cl, N, and S is an electrochemically inert anion, it is believed that when oxygen included in the lithium composite oxide is partially substituted by the at least one selected from the group consisting of F, Cl, N, and S, a crystalline structure of the lithium composite oxide according to Embodiment 1 can be stabilized. By this substitution, it is believed that a discharge capacity of the battery is improved, and an energy density thereof is increased.

If the lithium composite oxide according to Embodiment 1 does not include the at least one selected from the group consisting of F, Cl, N, and S, a redox amount of oxygen is increased. Hence, by oxygen elimination, the crystalline structure is liable to become unstable, and the capacity or cycle characteristics of the battery may be degraded in some cases.

The lithium composite oxide according to Embodiment 1 includes Mn. Since a hybrid orbital between Mn and oxygen can be easily formed, the oxygen elimination during charge can be suppressed, and the crystalline structure is stabilized. As a result, the capacity of the battery can be improved.

Furthermore, the lithium composite oxide according to Embodiment 1 has a crystalline structure which belongs to the space group Fd-3m. In the lithium composite oxide according to Embodiment 1, the following formula (I) is satisfied.

$$1.40 \leq \text{intensity ratio } I_{Mn1}/I_{Mn2} \leq 1.90 \quad (I)$$

In the relationship described above, the intensity ratio $I_{Mn1}/I_{Mn2}$ is a ratio of an intensity $I_{Mn1}$ to an intensity $I_{Mn2}$, the intensity $I_{Mn1}$ is an intensity of a first proximity peak of the Mn in a radial distribution function of the Mn included in the lithium composite oxide, and the intensity $I_{Mn2}$ is an intensity of a second proximity peak of the Mn in the radial distribution function of the Mn included in the lithium composite oxide. The first proximity peak is the most proximity peak. Since the formula (I) is satisfied, the capacity of the battery can be improved.

First, the radial distribution function to be used to specify the lithium composite oxide according to Embodiment 1 will be described. The radial distribution function is an absolute value obtained such that a vibration component $\chi(k)$ of an EXAFS spectrum is multiplied by k3 and is then Fourier transformed. A horizontal axis r of the radial distribution function represents a distance from an X-ray absorbing atom (that is, an atom of interest). A vertical axis of the radial distribution function represents an electron density. From the radial distribution function, information can be obtained. As examples of the information, (i) a distance between an X-ray absorbing atom and an X-ray scattering atom (that is, an atom in the vicinity of the X-ray absorbing atom), or (ii) the number of X-ray scattering atoms may be obtained. As described above, the information in the vicinity of the atom of interest can be obtained.

In Embodiment 1, the intensity ratio between the peaks of the radial distribution function obtained at the K absorption edge of Mn will be primarily discussed. In Embodiment 1, the intensity of the peak of the radial distribution function indicates an integrated intensity of the peak obtained by using the generally known "Artemis".

The intensity $I_{Mn1}$ of the first proximity peak of Mn in the lithium composite oxide of Embodiment 1 typically represents an intensity of a peak of an anion (that is, at least one anion selected from the group consisting of F, Cl, N, and S and an oxygen anion) which is bonded to the Mn atom. The first proximity peak described above is observed in a range of greater than or equal to 0.11 nm and less than or equal to 0.17 nm. The first proximity peak described above is observed, for example, at approximately 0.14 nm.

The intensity $I_{Mn2}$ of the second proximity peak of Mn in the lithium composite oxide of Embodiment 1 typically represents an intensity of a peak of a cation (that is, a cation of Li or a transition metal (including Mn) cation). The second proximity peak described above is observed in a range of greater than or equal to 0.21 nm and less than or equal to 0.27 nm. The second proximity peak described above is observed, for example, at approximately 0.24 nm.

The space group Fd-3m includes a Li layer and a transition metal layer. The intensity ratio $I_{Mn1}/I_{Mn2}$ is a parameter which can be used as an index of cation mixing in a lithium composite oxide having a crystalline structure which belongs to the space group Fd-3m. When Li intrudes in the transition metal layer, although the intensity $I_{Mn2}$ of the second proximity peak is remarkably decreased, the intensity $I_{Mn1}$ of the first proximity peak is hardly changed. The reason for this is that the number of electrons of Li is smaller than the number of electrons of a transition metal cation. Hence, based on the intensity ratio $I_{Mn1}/I_{Mn2}$, the rate of the cation mixing can be evaluated. The "cation mixing" in the present disclosure indicates a state in which in the crystalline structure of the lithium composite oxide, lithium ions and transition metal cations are substituted by each other. When the cation mixing is decreased, the intensity ratio $I_{Mn1}/I_{Mn2}$ is decreased. When the cation mixing is increased, the intensity ratio $I_{Mn1}/I_{Mn2}$ is increased.

In the lithium composite oxide according to Embodiment 1, when the intensity ratio $I_{Mn1}/I_{Mn2}$ is greater than 1.90, the rate of Li occupied in the transition metal layer is excessively increased. As a result, the crystalline structure becomes thermodynamically unstable. Hence, in association with Li elimination during charge, the crystalline structure is destroyed, and the capacity of the battery becomes insufficient.

In the lithium composite oxide according to Embodiment 1, when the intensity ratio $I_{Mn1}/I_{Mn2}$ is less than 1.40, since the cation mixing is suppressed, the rate of Li occupied in the transition metal layer is decreased. As a result, a three-dimensional diffusion path of Li is decreased. Hence, the diffusivity of Li is decreased, and the capacity of the battery becomes insufficient.

As described above, since having a crystalline structure which belongs to space group Fd-3m and having an intensity ratio $I_{Mn1}/I_{Mn2}$ of greater than or equal to 1.40 and less than or equal to 1.90, the lithium composite oxide according to Embodiment 1 is believed to have a sufficient cation mixing state between lithium atoms and transition metal cations. In other words, in the lithium composite oxide according to Embodiment 1, the crystalline structure is believed to be sufficiently distorted. Hence, in the lithium composite oxide according to Embodiment 1, besides a high diffusivity of Li in the Li layer, the diffusivity of Li is also improved in the transition metal layer. Furthermore, the diffusivity of Li between the Li layer and the transition metal layer is also improved. That is, in the lithium composite oxide according to Embodiment 1, it is believed that since the three-dimensional diffusion path of lithium is increased, the capacity of the battery is improved.

In a related lithium composite oxide including at least one selected from the group consisting of F, Cl, N, and S, although the crystalline structure is stabilized, an electron conductivity is decreased. Hence, a battery including a related lithium composite oxide has not a sufficient capacity. However, the lithium composite oxide according to Embodiment 1 includes at least one selected from the group consisting of F, Cl, N, and S and, in addition, also has a sufficiently distorted crystalline structure. Hence, in the lithium composite oxide according to Embodiment 1, the stability of the crystalline structure and the diffusivity of Li are both improved, and the electron conductivity can be suppressed from being decreased. As a result, a battery including the lithium composite oxide according to Embodiment 1 is able to have a higher capacity more than expected.

The intensity ratio $I_{Mn1}/I_{Mn2}$ may be greater than or equal to 1.49 and less than or equal to 1.83.

Since a lithium composite oxide having an intensity ratio $I_{Mn1}/I_{Mn2}$ of greater than or equal to 1.49 and less than or equal to 1.83 further improves the diffusivity of Li, the capacity of the battery can be further improved.

The intensity ratio $I_{Mn1}/I_{Mn2}$ may also be greater than or equal to 1.66 and less than or equal to 1.83.

Since a lithium composite oxide having an intensity ratio $I_{Mn1}/I_{Mn2}$ of greater than or equal to 1.66 and less than or equal to 1.83 further improves the diffusivity of Li, the capacity of the battery can be further improved.

When the lithium composite oxide according to Embodiment 1 has a crystalline structure which belongs to the space group Fd-3m and has an intensity ratio $I_{Mn1}/I_{Mn2}$ of greater than or equal to 1.40 and less than or equal to 1.90, even if a large amount of Li is pulled out, transition metal-anion octahedrons each functioning as a pillar three-dimensionally form a network. Hence, the crystalline structure is more stably maintained. As a result, a larger amount of Li can be occluded and released. As described above, the capacity of the battery is improved. Furthermore, by the same reason as described above, the battery is excellent in cycle characteristics.

When a large amount of Li is pulled out, since a layered structure having a crystalline structure which belongs to the space group Fd-3m is likely to be maintained as compared to a layered structure having a crystalline structure which belongs to the space group R-3m, the crystalline structure which belongs to the space group Fd-3m is believed not to be easily destroyed.

The lithium composite oxide according to Embodiment 1 may include, besides the crystalline structure which belongs to the space group Fd-3m, another crystalline structure (such as a crystalline structure which belongs to the space group Fm-3m).

The lithium composite oxide according to Embodiment 1 may include F.

Since a fluorine atom has a high electronegativity, when oxygen is partially substituted by a fluorine atom, an interaction between cations and anions is increased, and a discharge capacity or an operation voltage of the battery is improved. By the same reason as described above, compared to the case in which no F is included, electrons are localized due to solid solution of F. Accordingly, the oxygen elimination during charge is suppressed, and the crystalline structure is stabilized. As a result, even if the crystalline structure is distorted, the crystalline structure is stably maintained. Since those effects are comprehensively obtained, the capacity of the battery is further improved.

In the lithium composite oxide according to Embodiment 1, the transition metal layer may include transition metal cations. The transition metal layer may include, for example, besides Mn (to be exact, Mn cations), at least one (to be exact, at least one type of cations) selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

The lithium composite oxide as described above improves the capacity of the battery.

The lithium composite oxide according to Embodiment 1 may include, besides Mn, at least one selected from the group consisting of Co, Ni, Fe, Cu, V, Ti, Cr, and Zn. That is, the lithium composite oxide according to Embodiment 1 may include at least one 3d transition metal element.

A lithium composite oxide including a 3d transition metal element further improves the capacity of the battery.

The lithium composite oxide according to Embodiment 1 may include, besides Mn, at least one selected from the group consisting of Co, Ni, P, and Al.

A lithium composite oxide including, besides Mn, at least one selected from the group consisting of Co, Ni, P, and Al can further improve the capacity of the battery.

The lithium composite oxide according to Embodiment 1 may include Mn.

As described above, since the hybrid orbital between Mn and oxygen can be easily formed, the oxygen elimination is suppressed during charge. Hence, even when the crystalline structure is distorted, the crystalline structure can be stably maintained. As a result, the capacity of the battery can be improved.

Next, one example of a chemical composition of the lithium composite oxide according to Embodiment 1 will be described.

The lithium composite oxide according to Embodiment 1 may be a compound represented by the following composition formula (1).

$$Li_x(Mn_zMe_{1-z})_yO_\alpha Q_\beta \qquad (1)$$

In the above formula, Me is at least one selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al, and Q is at least one selected from the group consisting of F, Cl, N, and S. In addition, in the composition formula (1), the following five relationships may be satisfied.

$$1.05 \le x \le 1.4,\ 0.6 \le y \le 0.95,\ 0 < z \le 1.0,\ 1.33 \le \alpha < 2,\ \text{and}\ 0 < \beta \le 0.67.$$

The lithium composite oxide described above further improves the capacity of the battery.

When Q is formed of at least two types of elements (such as Q' and Q") and is represented by a chemical formula $Q'_{\beta 1}Q''_{\beta 2}$, "$\beta=\beta 1+\beta 2$" is satisfied. For example, when Q is represented by a chemical formula "$F_{0.05}Cl_{0.05}$", "$\beta=0.05+0.05=0.1$" is satisfied. When Me is formed of at least two types of elements, calculation may also be performed as in the case of Q.

When x is greater than or equal to 1.05, the amount of Li which can be occluded in and released from the positive electrode active material is increased. Hence, the capacity of the battery is improved.

When x is less than or equal to 1.4, the amount of Li to be occluded in and released from the positive electrode active material is increased by a redox reaction of Mn and Me. As a result, a redox reaction of oxygen is not so much required to be used. Accordingly, the crystalline structure is stabilized. Hence, the capacity of the battery is improved.

When y is greater than or equal to 0.6, the amount of Li to be occluded in and released from the positive electrode active material is increased by a redox reaction of Me. As a result, the redox reaction of oxygen is not so much required to be used. Accordingly, the crystalline structure is stabilized. Hence, the capacity of the battery is improved.

When y is less than or equal to 0.95, the amount of Li which can be occluded in and released from the positive electrode active material is increased. Hence, the capacity of the battery is improved.

When z is greater than 0, since the hybrid orbital between Mn and oxygen is easily formed, the oxygen elimination is suppressed during charge. As a result, the crystalline structure is stabilized, and the capacity of the battery is improved.

When $\alpha$ is greater than or equal to 1.33, a charge compensation amount by the redox reaction of oxygen can be prevented from being decreased. Hence, the capacity of the battery is improved.

When $\beta$ is less than 2, a capacity by the redox reaction of oxygen can be prevented from being excessive. Accordingly, even when Li which stabilizes the structure is eliminated, the crystalline structure is stably maintained. Hence, the capacity of the battery is improved.

When $\beta$ is greater than 0, by an influence of electrochemical inertness of Q, even when Li is eliminated, the crystalline structure is stably maintained. Hence, the capacity of the battery is improved.

When $\beta$ is less than or equal to 0.67, since an increase in influence of electrochemical inertness of Q can be prevented, the electron conductivity is improved. Hence, the capacity of the battery is improved.

Q may include F.

That is, Q may be F.

Alternatively, Q may include not only F but also at least one selected from the group consisting of Cl, N, and S.

Since a fluorine atom has a high electronegativity, when oxygen is partially substituted by a fluorine atom, an interaction between cations and anions is increased, and a discharge capacity or an operation voltage of the battery is improved. By the same reason as described above, compared to the case in which no F is included, electrons are localized due to solid solution of F. Accordingly, the oxygen elimination during charge is suppressed, and the crystalline structure is stabilized. As a result, even if the crystalline structure is distorted, the crystalline structure is stably maintained. Since those effects are comprehensively obtained, the capacity of the battery is further improved.

Me may include at least one selected from the group consisting of Co, Ni, Fe, Cu, V, Ti, Cr, and Zn. That is, Me may include at least one 3d transition metal element.

A lithium composite oxide including a 3d transition metal element further improves the capacity of the battery.

Me may include at least one selected from the group consisting of Co, Ni, P, and Al.

A lithium composite oxide including at least one selected from the group consisting of Co, Ni, P, and Al further improves the capacity of the battery.

The value of z may be greater than or equal to 0.875 and less than or equal to 1.0.

That is, in the compound represented by the composition formula (1), a molar ratio of Mn to (Mn+Me) may be greater than or equal to 87.5%. That is, a molar ratio of Mn (that is, Mn/(Mn+Me) with respect to the total amount of Mn and Me may be greater than or equal to 0.875 and less than or equal to 1.0.

As described above, the hybrid orbital between Mn and oxygen can be easily formed. Since a lithium composite oxide having z of greater than or equal to 0.875 has a sufficient amount of Mn, the oxygen elimination during charge can be further suppressed. As a result, even when the crystalline structure is distorted, the crystalline structure is stably maintained, and the capacity of the battery is further improved.

The compound represented by the composition formula (1) may include no Me. That is, z may be 1.

When z is 1, since an amount of Mn which easily forms a hybrid orbital with oxygen is large, the oxygen elimination during charge can be further suppressed. As a result, even when the crystalline structure is distorted, the crystalline structure is stably maintained, and the capacity of the battery is further improved.

In the compound represented by the composition formula (1), in order to obtain a molar ratio of at least one selected from the group consisting of B, Si, P, and Al to (Mn+Me) of less than or equal to 0.2, Me may include at least one selected from the group consisting of B, Si, P, and Al.

At least one selected from the group consisting of B, Si, P, and Al has a high covalent bonding property. Hence, the at least one selected from the group consisting of B, Si, P, and Al stabilizes the crystalline structure of the lithium composite oxide. As a result, the cycle characteristics of the battery are improved, and the life of the battery can be increased.

In order to further improve the capacity of the battery, the following two relationships may be satisfied.

$1.1 \leq x \leq 1.2$ and $y=0.8$.

In order to further improve the capacity of the battery, the following two relationships may be satisfied.

$1.67 \leq \alpha \leq 1.9$ and $0.1 \leq \beta \leq 0.33$.

A molar ratio of "Li" to "Mn and Me" is represented by an expression (x/y).

A molar ratio (x/y) may be greater than or equal to 1.3 and less than or equal to 1.9.

A lithium composite oxide having a molar ratio (x/y) of greater than or equal to 1.3 and less than or equal to 1.9 further improves the capacity of the battery.

When the molar ratio (x/y) is greater than 1, for example, compared to the ratio of the number of Li atoms in a related positive electrode active material represented by a composition formula $LiMnO_2$, the ratio of the number of Li atoms in the lithium composite oxide according to Embodiment 1 is high. Hence, a larger amount of Li can be occluded and released.

When the molar ratio (x/y) is greater than or equal to 1.3, since the amount of Li to be used is large, the diffusion path of Li is appropriately formed. Hence, when the molar ratio (x/y) is greater than or equal to 1.3, the capacity of the battery is further improved.

When the molar ratio (x/y) is less than or equal to 1.9, a usable redox reaction of Me is prevented from being decreased. As a result, the redox reaction of oxygen is not so much required to be used. A decrease in Li occlusion efficiency during discharge, which is caused by a crystalline structure unstabilized due to Li elimination during charge, can be suppressed. Hence, the capacity of the battery is further improved.

In order to further improve the capacity of the battery, the molar ratio (x/y) may also be greater than or equal to 1.38 and less than or equal to 1.5.

A molar ratio of O to Q is represented by an expression $(\alpha/\beta)$.

In order to further improve the capacity of the battery, the molar ratio $(\alpha/\beta)$ may be greater than or equal to 5 and less than or equal to 19.

When the molar ratio $(\alpha/\beta)$ is greater than or equal to 5, the charge compensation amount by the redox reaction of oxygen can be prevented from being decreased. Furthermore, since the influence of the electrochemically inert Q can be decreased, the electron conductivity is improved. Hence, the capacity of the battery is further improved.

When the molar ratio $(\alpha/\beta)$ is less than or equal to 19, the capacity by the redox reaction of oxygen can be prevented from being excessive. Accordingly, even when Li is eliminated, the crystalline structure remains stable. Furthermore, since the influence of the electrochemically inert Q can be obtained, even when Li is eliminated, the crystalline structure remains stable. Hence, the capacity of the battery is further improved.

As described above, the lithium composite oxide according to Embodiment 1 can be represented by a composition formula $Li_x(Mn_zMe_{1-z})_yO_\alpha Q_\beta$. Hence, the lithium composite oxide according to Embodiment 1 is formed of a cationic portion and an anionic portion. The cationic portion is formed of Li, Mn, and Me. The anionic portion is formed of O and Q. A molar ratio of the cationic portion formed of Li, Mn, and Me to the anionic portion formed of O and Q is represented by an expression $((x+y)/(\alpha+\beta))$.

In order to further improve the capacity of the battery, the molar ratio $((x+y)/(\alpha+\beta))$ may be greater than or equal to 0.75 and less than or equal to 1.2.

When the molar ratio $((x+y)/(\alpha+\beta))$ is greater than or equal to 0.75, a large amount of impurities is prevented from being generated when the lithium composite oxide is synthesized, and the capacity of the battery is further improved.

When the molar ratio $((x+y)/(\alpha+\beta))$ is less than or equal to 1.2, since a deficient amount of the anionic portion of the lithium composite oxide is small, even after lithium is eliminated from the lithium composite oxide by charge, the crystalline structure is stably maintained. Hence, the capacity of the battery is further improved.

The molar ratio $((x+y)/(\alpha+\beta))$ may also be greater than or equal to 0.95 and less than or equal to 1.0.

A lithium composite oxide having a molar ratio $((x+y)/(\alpha+\beta))$ of greater than or equal to 0.95 and less than or equal to 1.0 is used to provide a battery excellent in capacity and cycle characteristics.

When the molar ratio $((x+y)/(\alpha+\beta))$ is less than or equal to 1.0, the lithium composite oxide has a cation deficient structure. As a result, a larger number of Li diffusion paths are formed in the lithium composite oxide. Hence, the capacity of the battery is improved. Since cation deficiencies are randomly arranged at the initial stage, even when Li is eliminated, the crystalline structure is stably maintained. As described above, a long-life battery excellent in cycle characteristics can be provided.

In the lithium composite oxide according to Embodiment 1, Li may be partially substituted by an alkali metal, such as Na or K.

The positive electrode active material in Embodiment 1 may include the lithium composite oxide described above as a primary component. In other words, the positive electrode active material according to Embodiment 1 may include the lithium composite oxide described above so that a mass rate thereof with respect to the total mass of the positive electrode active material is greater than or equal to 50%. The positive electrode active material as described above further improves the capacity of the battery.

In order to further improve the capacity of the battery, the mass rate described above may also be greater than or equal to 70%.

In order to further improve the capacity of the battery, the mass rate described above may also be greater than or equal to 90%.

The positive electrode active material according to Embodiment 1 may also include, besides the lithium composite oxide described above, inevitable impurities.

The positive electrode active material according to Embodiment 1 may also include, as unreacted substances, its starting raw materials. The positive electrode active material according to Embodiment 1 may also include a by-product which is produced when the lithium composite oxide is synthesized. The positive electrode active material according to Embodiment 1 may also include a decomposed product which is produced when the lithium composite oxide is decomposed.

The positive electrode active material according to Embodiment 1 may include only the lithium composite oxide described above except for the inevitable impurities.

A positive electrode active material which includes only a lithium composite oxide further improves the capacity of the battery.

Method for Forming Lithium Composite Oxide

Hereinafter, one example of a method for manufacturing a lithium composite oxide included in the positive electrode active material according to Embodiment 1 will be described.

The lithium composite oxide according to Embodiment 1 may be formed, for example, by the following method.

A raw material including Li, a raw material including Mn, a raw material including Me, and a raw material including Q are prepared.

As the raw material including Li, for example, there may be mentioned a lithium oxide, such as $Li_2O$ or $Li_2O_2$, a lithium salt, such as LiF, $Li_2CO_3$, or LiOH, or a lithium composite oxide, such as $LiMeO_2$ or $LiMe_2O_4$.

As the raw material including Mn, for example, there may be mentioned a manganese oxide, such as $MnO_2$ or $Mn_2O_3$, a manganese salt, such as $MnCO_3$ or $Mn(NO_3)_2$, a manganese hydroxide, such as $Mn(OH)_2$ or MnOOH, or a lithium manganese composite oxide, such as $LiMnO_2$ or $LiMn_2O_4$.

As the raw material including Me, for example, there may be mentioned a metal oxide, such as $Me_2O_3$, a metal salt, such as $MeCO_3$ or $Me(NO_3)_2$, a metal hydroxide, such as $Me(OH)_2$ or MeOOH, or a lithium composite oxide, such as $LiMeO_2$ or $LiMe_2O_4$.

As the raw material including Q, for example, there may be mentioned a lithium halide, a transition metal halide, a transition metal sulfide, or a transition metal nitride.

When Q is F, as a raw material including F, for example, LiF or a transition metal fluoride may be mentioned.

Those raw materials are weighed, for example, so as to have molar ratios represented by the composition formula (1).

As described above, the values of x, y, z, $\alpha$, and $\beta$ can be changed in the ranges shown by the composition formula (1).

The raw materials are mixed together, for example, by a dry method or a wet method and are then mechanochemically reacted to each other in a mixing apparatus, such as a planetary ball mill, for greater than or equal to 10 hours, so that a compound (that is, a precursor of the lithium composite oxide) is obtained.

Subsequently, the compound thus obtained is processed by a heat treatment, so that some atoms are orderly arranged. As described above, the lithium composite oxide according to Embodiment 1 is obtained.

The conditions of the heat treatment are appropriately determined so as to obtain the lithium composite oxide according to Embodiment 1. Although the optimum conditions of the heat treatment are changed dependent on other manufacturing conditions and a targeted composition, the present inventors found that, for example, as the temperature of the heat treatment is higher, and as the time for the heat treatment is increased, the rate of cation mixing tends to decrease. A manufacturer may be able to determine the conditions of the heat treatment using this tendency as a guide line. The temperature and the time of the heat treatment may be selected from a range of 400° C. to 600° C. and from a range of 30 minutes to two hours, respectively. An example of an atmosphere of the heat treatment is an air atmosphere, an oxygen atmosphere, or an inert atmosphere (such as a nitrogen atmosphere or an argon atmosphere).

As described above, when the raw materials, the mixing conditions thereof, and the heat treatment conditions are adjusted, the lithium composite oxide according to Embodiment 1 can be obtained.

Since the lithium transition metal composite oxide is used as the precursor, energy required for mixing of elements can be decreased.

Accordingly, the purity of the lithium composite oxide according to Embodiment 1 can be increased.

The composition of the lithium composite oxide thus obtained can be determined, for example, by an inductively-coupled plasma (ICP) emission spectral analysis method, an inert gas fusion-infrared absorption method, an ion chromatography method, or a combination therebetween.

The space group of the crystalline structure of the lithium composite oxide thus obtained can be identified by a powder X-ray analysis method.

As described above, the method for manufacturing the positive electrode active material (that is, the lithium composite oxide) according to Embodiment 1 includes a step (a) of preparing the raw materials, a step (b) of mechanochemically reacting the raw materials to obtain a precursor of the positive electrode active material (that is, the lithium composite oxide), and a step (c) of performing a heat treatment on the precursor to obtain the positive electrode active material (that is, the lithium composite oxide).

The raw materials may be a mixed raw material, and in this mixed raw material, a ratio of Li to Me may be greater than or equal to 1.3 and less than or equal to 1.9.

In the step (a), the mixed raw material may be prepared by mixing the raw materials so that the molar ratio of Li to Me is greater than or equal to 1.38 and less than or equal to 1.5.

In the step (b), a ball mill may be used for a mechanochemical reaction.

As described above, in order to obtain the lithium composite oxide according to Embodiment 1, the raw materials (such as LiF, $Li_2O$, a transition metal, and/or a lithium composite oxide) may be mixed by a mechanochemical reaction using a planetary ball mill.

Embodiment 2

Hereinafter, Embodiment 2 will be described. The matters described in Embodiment 1 will be appropriately omitted.

A battery according to Embodiment 2 includes a positive electrode including the positive electrode active material according to Embodiment 1 described above, a negative electrode, and an electrolyte.

The battery according to Embodiment 2 has a high capacity.

In the battery according to Embodiment 2, the positive electrode may include a positive electrode active material layer. The positive electrode active material layer may include the positive electrode active material according to Embodiment 1 as a primary component. That is, a mass rate of the positive electrode active material with respect to the total of the positive electrode active material layer is greater than or equal to 50%.

The positive electrode active material layer as described above further improves the capacity of the battery.

The mass rate described above may also be greater than or equal to 70%.

The positive electrode active material layer as described above further improves the capacity of the battery.

The mass rate described above may also be greater than or equal to 90%.

The positive electrode active material layer as described above further improves the capacity of the battery.

The battery according to Embodiment 2 indicates, for example, a lithium ion secondary battery, a nonaqueous electrolyte secondary battery, or an all solid state battery.

In the battery according to Embodiment 2, the negative electrode may include a negative electrode active material capable of occluding and releasing lithium ions. Alternatively, the negative electrode may include a material from which a lithium metal is dissolved in the electrolyte during discharge and in which the lithium metal described above is precipitated during charge.

In the battery according to Embodiment 2, the electrolyte may be a nonaqueous electrolyte (such as a nonaqueous electrolyte liquid).

In the battery according to Embodiment 2, the electrolyte may be a solid electrolyte.

FIG. 1 is a cross-sectional view of a battery 10 according to Embodiment 2.

As shown in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

In the positive electrode 21, the negative electrode 22, and the separator 14, for example, a nonaqueous electrolyte (such as a nonaqueous electrolyte liquid) is impregnated.

By the positive electrode 21, the negative electrode 22, and the separator 14, an electrode group is formed.

The electrode group is received in the case 11.

By the gasket 18 and the sealing plate 15, the case 11 is sealed.

The positive electrode 21 includes a positive electrode collector 12 and a positive electrode active material layer 13 disposed thereon.

The positive electrode collector 12 is formed, for example, from a metal material (such as at least one selected from the group consisting of aluminum, stainless steel, nickel, iron, titanium, copper, palladium, gold, and platinum or an alloy thereof).

The positive electrode collector 12 may not be provided in some cases.

In the case described above, the case 11 is used as a positive electrode collector.

The positive electrode active material layer 13 includes the positive electrode active material according to Embodiment 1.

The positive electrode active material layer 13 may include, if needed, an additive (such as an electrically conductive agent, an ion conduction auxiliary agent, and/or a binding agent).

The negative electrode 22 includes a negative electrode collector 16 and a negative electrode active material layer 17 disposed thereon.

The negative electrode collector 16 is formed, for example, from a metal material (such as at least one selected from the group consisting of aluminum, stainless steel, nickel, iron, titanium, copper, palladium, gold, and platinum or an alloy thereof).

The negative electrode collector 16 may not be provided in some cases.

In the case described above, the sealing plate 15 is used as a negative electrode collector.

The negative electrode active material layer 17 includes a negative electrode active material.

The negative electrode active material layer 17 may include, if needed, an additive (such as an electrically conductive agent, an ion conduction auxiliary agent, and/or a binding agent).

As an example of a material of the negative electrode active material, there may be mentioned a metal material, a carbon material, an oxide, a nitride, a tin compound, or a silicon compound.

The metal material may be a single metal. Alternatively, the metal material may also be an alloy. As an example of the metal material, a lithium metal or a lithium alloy may be mentioned.

As an example of the carbon material, there may be mentioned a natural graphite, a coke, a graphitizing carbon, carbon fibers, a spherical carbon, an artificial graphite, or an amorphous carbon.

In view of capacity density, as the negative electrode active material, for example, silicon (that is, Si), tin (that is, Sn), a silicon compound, or a tin compound may be used. The silicon compound and the tin compound each may be an alloy or a solid solution.

As an example of the silicon compound, $SiO_x$ ($0.05 < x < 1.95$) may be mentioned. In addition, a compound in which a silicon atom of $SiO_x$ is partially substituted by another element may also be used. The compound described above is an alloy or a solid solution. As the another element, for example, there may be mentioned at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

As an example of the tin compound, for example, there may be mentioned $Ni_2Sn_4$, $Mg_2Sn$, $SnO_x$ (0<x<2), $SnO_2$, or $SnSiO_3$. One compound selected from those mentioned above may be used alone. Alternatively, at least two types of the tin compounds mentioned above may be used in combination.

The shape of the negative electrode active material is not limited. As the negative electrode active material, a negative electrode active material having a known shape (such as a particle shape or a fiber shape) may be used.

A method to replenish (that is, to occlude) lithium in the negative electrode active material layer 17 is not limited. As an example of this method, in particular, there may be mentioned a method (a) in which lithium is deposited on the negative electrode active material layer 17 by a vapor phase method, such as a vacuum deposition method, or a method (b) in which lithium metal foil and the negative electrode active material layer 17 are brought into contact with each other and are then heated. In both the methods, lithium is diffused in the negative electrode active material layer 17 by heat. A method in which lithium is electrochemically occluded in the negative electrode active material layer 17 may also be used. In particular, a battery is formed using a negative electrode 22 including no lithium and lithium metal foil (negative electrode). Subsequently, the battery is charged so that lithium is occluded in the negative electrode 22.

An example of the binding agent for the positive electrode 21 and the negative electrode 22, there may be mentioned a poly(vinylidene fluoride), a polytetrafluoroethylene, a polyethylene, a polypropylene, an aramid resin, a polyamide, a polyimide, a poly(amide imide), a polyacrylonitrile, a poly(acrylic acid), a poly(methyl acrylate), a poly(ethyl acrylate), a poly(hexyl acrylate), a poly(methacrylic acid), a poly(methyl methacrylate), a poly(ethyl methacrylate), a poly(hexyl methacrylate), a poly(vinyl acetate), a poly(vinyl pyrrolidone), a polyether, a poly(ether sulfone), a polyhexafluoropropylene, a styrene-butadiene rubber, or a carboxymethyl cellulose.

As an example of the binding agent, there may be mentioned a copolymer formed from at least two types of materials selected from the group consisting of tetrafluoroethylene, hexafluoroethylene, hexafluoropropylene, a perfluoroalkyl vinyl ether, vinylidene fluoride, chrolotrifluoroethylene, ethylene, propylene, pentafluoropropylene, fluoromethyl vinyl ether, acrylic acid, and hexadiene. Alternatively, a mixture of at least two types of binding agents selected from the materials mentioned above may also be used.

As an example of the electrically conductive agent of the positive electrode 21 and the negative electrode 22, there may be mentioned a graphite, a carbon black, electrically conductive fibers, a graphite fluoride, a metal powder, electrically conductive whiskers, an electrically conductive metal oxide, or an organic electrically conductive material.

As an example of the graphite, there may be mentioned a natural graphite or an artificial graphite.

As an example of the carbon black, there may be mentioned an acetylene black, a Ketjen black, a channel black, a furnace black, a lamp black, or a thermal black.

As an example of the metal powder, an aluminum powder may be mentioned.

As an example of the electrically conductive whiskers, there may be mentioned zinc oxide whiskers or potassium titanate whiskers.

As an example of the electrically conductive metal oxide, a titanium oxide may be mentioned.

As an example of the organic electrically conductive material, a phenylene derivative may be mentioned.

By using the electrically conductive agent, the surface of the binding agent may be partially covered. For example, the surface of the binding agent may be covered with a carbon black. Accordingly, the capacity of the battery can be improved.

A material of the separator 14 is a material having a high ion permeability and a sufficient mechanical strength. As an example of the material of the separator 14, there may be mentioned a fine porous thin film, a woven cloth, or a non-woven cloth. In particular, the separator 14 is preferably formed of a polyolefin, such as a polypropylene or a polyethylene. A separator 14 formed of a polyolefin is not only excellent in durability but also shows a shutdown function when being excessively heated. The thickness of the separator 14 is, for example, in a range of 10 to 300 μm (or 10 to 40 μm). The separator 14 may be a monolayer film formed from one type of material. Alternatively, the separator 14 may be a composite film (or a multilayer film) formed from at least two types of materials. A porosity of the separator 14 is, for example, in a range of 30% to 70% (or 35% to 60%). The term "porosity" indicates a rate of volume of pores in the total volume of the separator 14. The porosity is measured, for example, by a mercury intrusion method.

The nonaqueous electrolyte liquid includes a nonaqueous solvent and a lithium salt dissolved therein.

As an example of the nonaqueous solvent, there may be mentioned a cyclic carbonate ester solvent, a chain carbonate ester solvent, a cyclic ether solvent, a chain ether solvent, a cyclic ester solvent, a chain ester solvent, or a fluorine solvent.

As an example of the cyclic carbonate ester solvent, ethylene carbonate, propylene carbonate, or butylene carbonate may be mentioned.

As an example of the chain carbonate ester solvent, dimethyl carbonate, ethyl methyl carbonate, or diethyl carbonate may be mentioned.

As an example of the cyclic ether solvent, tetrahydrofuran, 1,4-dioxane, or 1,3-dioxolane may be mentioned.

As an example of the chain ether solvent, 1,2-dimethoxyethane or 1,2-diethoxyethane may be mentioned.

As an example of the cyclic ester solvent, γ-butyrolactone may be mentioned.

As an example of the chain ester solvent, methyl acetate may be mentioned.

As an example of the fluorine solvent, there may be mentioned fluoroethylene carbonate, methyl fluoropropionate, fluorobenzene, fluoroethyl methyl carbonate, or fluorodimethylene carbonate.

As the nonaqueous solvent, a solvent selected from those mentioned above may be used alone, or at least two types of nonaqueous solvents selected from those mentioned above may be used in combination.

The nonaqueous electrolyte liquid may include at least one fluorine solvent selected from the group consisting of fluoroethylene carbonate, methyl fluoropropionate, fluorobenzene, fluoroethyl methyl carbonate, and fluorodimethylene carbonate.

When at least one type of the fluorine solvents mentioned above is included in the nonaqueous electrolyte liquid, an oxidation resistance thereof is improved.

As a result, even when the battery 10 is charged at a high voltage, the battery 10 can be stably operated.

In the battery according to Embodiment 2, the electrolyte may be a solid electrolyte.

As an example of the solid electrolyte, an organic polymer solid electrolyte, an oxide solid electrolyte, or a sulfide solid electrolyte may be mentioned.

As an example of the organic polymer solid electrolyte, a compound of a polymer compound and a lithium salt may be mentioned. As an example of the compound as described above, a lithium polystyrenesulfonate may be mentioned.

The polymer compound may have an ethylene oxide structure. Since having an ethylene oxide structure, the polymer compound is able to include a large amount of a lithium salt. As a result, the ion conductivity can be further increased.

As an example of the oxide solid electrolyte, there may be mentioned (i) a NASICON solid electrolyte, such as $LiTi_2(PO_4)_3$ or its substitute, (ii) a perovskite solid electrolyte, such as $(LaLi)TiO_3$, (iii) a LISICON solid electrolyte, such as $Li_{14}ZnGe_4O_{16}$, $Li_4SiO_4$, $LiGeO_4$, or its substitute, (iv) a garnet solid electrolyte, such as $Li_7La_3Zr_2O_{12}$ or its substitute, (v) $Li_3N$ or its H substituent, or (vi) $Li_3PO_4$ or its N substituent.

As an example of the sulfide solid electrolyte, there may be mentioned $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. To the sulfide solid electrolyte, LiX (X is F, Cl, Br, or I), $MO_y$, or $Li_xMO_y$ (M is P, Si, Ge, B, Al, Ga, or In, and x and y are each independently a natural number) may be added.

Among those mentioned above, the sulfide solid electrolyte is excellent in formability and has a high ion conductivity. Hence, when the sulfide solid electrolyte is used as a solid electrolyte, the energy density of the battery can be further improved.

Among the sulfide solid electrolytes, $Li_2S$—$P_2S_5$ has a high electrochemical stability and a high ion conductivity. Hence, as the solid electrolyte, when $Li_2S$—$P_2S_5$ is used, the energy density of the battery can be further improved.

In a solid electrolyte layer including a solid electrolyte, the nonaqueous electrolyte liquid described above may be further included.

Since the solid electrolyte layer includes a nonaqueous electrolyte liquid, lithium ions are easily transferred between the active material and the solid electrolyte. As a result, the energy density of the battery can be further improved.

The solid electrolyte layer may include a gel electrolyte or an ionic liquid.

As an example of the gel electrolyte, a polymer material impregnated with a nonaqueous electrolyte liquid may be mentioned. As an example of the polymer material, there may be mentioned a poly(ethylene oxide), a polyacrylonitrile, a poly(vinylidene fluoride), or a poly(methyl methacrylate). As another example of the polymer material, a polymer having an ethylene oxide bond may be mentioned.

As an example of a cation included in the ionic liquid, there may be mentioned (i) a cation of an aliphatic chain quaternary ammonium salt, such as a tetraalkylammonium, (ii) a cation of an aliphatic chain quaternary phosphonium salt, such as a tetraalkylphosphonium, (iii) an aliphatic cyclic ammonium, such as pyrrolidinium, morpholinium, imidazolinium, tetrahydropyrimidinium, piperadinium, or piperidinium, or (iv) a nitrogen-including hetero ring aromatic cation, such as pyridinium or imidazolium.

As an example of an anion forming the ionic liquid, for example, there may be mentioned $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may also include a lithium salt.

As an example of the lithium salt, there may be mentioned $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)_2$, or $LiC(SO_2CF_3)_3$. As the lithium salt, a lithium salt selected from those mentioned above may be used alone. Alternatively, a mixture of at least two types of lithium salts selected from those mentioned above may be used as the lithium salt. The concentration of the lithium salt is, for example, in a range of 0.5 to 2 mol/liter.

As the shape of the battery according to Embodiment 2, for example, there may be mentioned a coin battery, a cylindrical battery, a square battery, a sheet battery, a button battery (that is, a button cell), a flat battery, or a laminate battery.

EXAMPLES

Example 1

Formation of Positive Electrode Active Material

A mixture including LiF, $Li_2MnO_3$, and $LiMnO_2$ was obtained so that a molar ratio of Li/Mn/O/F was 1.2/0.8/1.67/0.33.

The mixture thus obtained was received in a includeer having a volume of 45 milliliter together with an appropriate amount of zirconia-made balls each having a diameter of 3 mm, and the includeer was sealed in an argon glove box. The includeer was formed of zirconia.

Subsequently, the includeer was recovered from the argon glove box. The mixture in the includeer was treated by a planetary ball mill at 600 rpm for 30 hours in an argon atmosphere, so that a precursor was formed.

A powder X-ray diffraction measurement was performed on the precursor thus obtained.

From the result of the powder X-ray diffraction measurement, the space group of the precursor was identified as Fm-3m.

Next, the precursor thus obtained was heat-treated at 500° C. for 1 hour in an air atmosphere. As described above, a positive electrode active material of Example 1 was obtained.

A powder X-ray diffraction measurement was performed on the positive electrode active material of Example 1.

From the result of the powder X-ray diffraction measurement, the space group of the positive electrode active material of Example 1 was identified as Fd-3m.

Furthermore, an EXAFS spectrum of the positive electrode active material of Example 1 was measured, so that a radial distribution function around a Mn atom was obtained.

Figure 2:
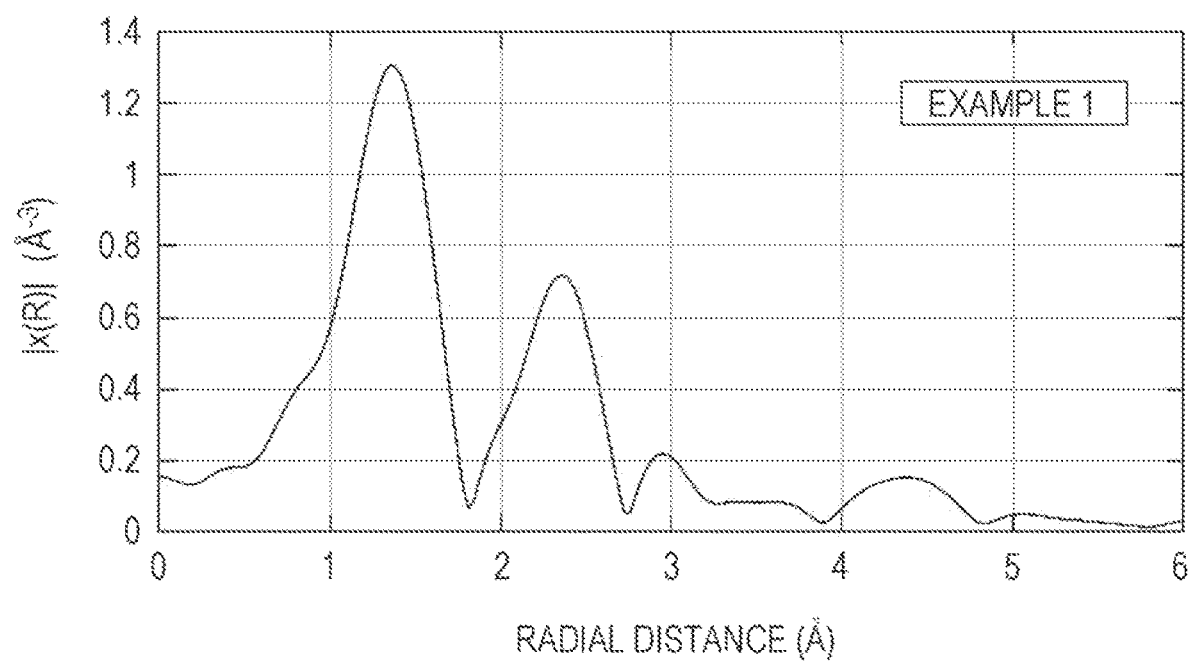
FIG. 2 is a graph showing a radial distribution function of Mn included in a positive electrode active material of Example 1.

The result of the measurement is shown in FIG. 2.

An intensity ratio $I_{Mn1}/I_{Mn2}$ of the positive electrode active material of Example 1 was 1.78.

Formation of Battery

Next, 70 parts by mass of the positive electrode active material of Example 1, 20 parts by mass of an acetylene black, 10 parts by mass of a poly(vinylidene fluoride) (hereinafter, referred to as "PVdF"), and an appropriate amount of N-methyl-2-pyrrolidone (hereinafter, referred to as "NMP") were mixed together. Accordingly, a positive electrode mixture slurry was obtained. The acetylene black functioned as an electrically conductive agent. The poly(vinylidene fluoride) functioned as a binding agent.

The positive electrode mixture slurry was applied to one surface of a positive electrode collector formed of aluminum foil having a thickness of 20 µm.

The positive electrode mixture slurry was dried and then rolled, so that a positive electrode plate including a positive electrode active material layer and having a thickness of 60 µm was obtained.

The positive electrode plate thus obtained was punched out, so that a disc-shaped positive electrode having a diameter of 12.5 mm was obtained.

Lithium metal foil having a thickness of 300 µm was punched out, so that a disc-shaped negative electrode having a diameter of 14 mm was obtained.

Besides the formation of the electrodes, fluoroethylene carbonate (hereinafter, referred to as "FEC"), ethylene carbonate (hereinafter, referred to as "EC"), and ethyl methyl carbonate (hereinafter, referred to as "EMC") were mixed at a volume ratio of 1:1:6, so that a nonaqueous solvent was obtained.

To this nonaqueous solvent, $LiPF_6$ was dissolved to have a concentration of 1.0 mol/liter, so that a nonaqueous electrolyte liquid was obtained.

The nonaqueous electrolyte liquid thus obtained was impregnated in a separator. As the separator, a product (product No. 2320, thickness: 25 µm) of Celgard, LLC was used. This separator was a three-layered separator formed from a polypropylene layer, a polyethylene layer, and a polypropylene layer.

By the use of the positive electrode, the negative electrode, and the separator described above, in a dry box in which the dew point was maintained at −50° C., a coin battery having a diameter of 20 mm and a thickness of 3.2 mm was formed.

Examples 2 to 10

In each of Examples 2 to 10, except for the following matters (i) and (ii), a positive electrode active material was obtained in a manner similar to that of Example 1.
(i) A mixing ratio (that is, a mixing ratio of Li/Me/O/F) of the mixture was changed.
(ii) Heating conditions were changed in a range of 400° C. to 600° C. and in a range of 30 minutes to two hours.

The space group of the positive electrode active material of each of Examples 2 to 10 was Fd-3m.

In each of Examples 2 to 10, as was Example 1, the precursor was prepared by using the raw materials which were mixed together based on the stoichiometric ratio.

For example in Example 7, A mixture including LiF, $Li_2MnO_3$, $LiMnO_2$, and $LiAlO_2$ at a molar ratio Li/Mn/Al/O/F of 1.2/0.75/0.05/1.67/0.33 was used.

By the use of the positive electrode active materials of Examples 2 to 10, coin batteries of Examples 2 to 10 were each formed in a manner similar to that of Example 1.

Comparative Example 1

In Comparative Example 1, a positive electrode active material having a composition represented by $LiMn_2O_4$ (that is, lithium manganese composite oxide) was obtained by a known method.

A powder X-ray diffraction measurement was performed on the positive electrode active material thus obtained.

According to the result of the powder X-ray diffraction measurement, the space group of the positive electrode active material of Comparative Example 1 was identified as Fd-3m.

Furthermore, an EXAFS spectrum of the positive electrode active material of Comparative Example 1 was measured, and a radial distribution function around a Mn atom was obtained.

An intensity ratio $I_{Mn1}/I_{Mn2}$ of the positive electrode active material of Comparative Example 1 was 0.83.

By the use of the positive electrode active material of Comparative Example 1, a coin battery of Comparative Example 1 was formed in a manner similar to that of Example 1.

Comparative Example 2

A positive electrode active material having a composition represented by a chemical formula $Li_{1.2}Mn_{0.8}O_{1.67}F_{0.33}$ was obtained in a manner similar to that of Example 1.

In Comparative Example 2, the heat treatment was performed at 500° C. for 5 hours.

According to the result of a powder X-ray diffraction measurement, the space group of the positive electrode active material of Comparative Example 2 was identified as Fd-3m.

Furthermore, an EXAFS spectrum of the positive electrode active material of Comparative Example 2 was measured, and a radial distribution function around a Mn atom was obtained.

An intensity ratio $I_{Mn1}/I_{Mn2}$ of the positive electrode active material of Comparative Example 2 was 1.12.

By the use of the positive electrode active material thus obtained, a coin battery of Comparative Example 2 was formed in a manner similar to that of Example 1.

Comparative Example 3

A positive electrode active material having a composition represented by a chemical formula $Li_{1.2}Mn_{0.8}O_{1.9}F_{0.1}$ was obtained in a manner similar to that of Example 1.

In Comparative Example 3, the heat treatment was performed at 500° C. for 5 hours.

According to the result of a powder X-ray diffraction measurement, the space group of the positive electrode active material of Comparative Example 3 was identified as Fd-3m.

Furthermore, an EXAFS spectrum of the positive electrode active material of Comparative Example 3 was measured, and a radial distribution function around a Mn atom was obtained.

An intensity ratio $I_{Mn1}/I_{Mn2}$ of the positive electrode active material of Comparative Example 3 was 1.23.

By the use of the positive electrode active material thus obtained, a coin battery of Comparative Example 3 was formed in a manner similar to that of Example 1.

Evaluation of Battery

The battery of Example 1 was charged at a current density of 0.5 mA/cm$^2$ to a voltage of 4.9 volt.

Subsequently, the battery of Example 1 was discharged at a current density of 0.5 mA/cm$^2$ to a voltage of 2.5 volt.

An initial discharge capacity of the battery of Example 1 was 300 mAh/g.

The battery of Comparative Example 1 was charged at a current density of 0.5 mA/cm$^2$ to a voltage of 4.3 volt.

Subsequently, the battery of Comparative Example 1 was discharged at a current density of 0.5 mA/cm$^2$ to a voltage of 2.5 volt.

An initial discharge capacity of the battery of Comparative Example 1 was 140 mAh/g.

As described above, an initial discharge capacity of the coin battery of each of Examples 2 to 10 and Comparative Examples 2 and 3 was measured.

In the following Table 1, the results of Examples 1 to 10 and Comparative Examples 1 to 3 are shown.

TABLE 1

|  | AVERAGE COMPOSITION | SPACE GROUP | $I_{Mn1}/I_{Mn2}$ | INITIAL DISCHARGE CAPACITY (mAh/g) |
|---|---|---|---|---|
| EXAMPLE 1 | $Li_{1.2}Mn_{0.8}O_{1.67}F_{0.33}$ | Fd-3m | 1.78 | 300 |
| EXAMPLE 2 | $Li_{1.2}Mn_{0.8}O_{1.67}F_{0.33}$ | Fd-3m | 1.83 | 291 |
| EXAMPLE 3 | $Li_{1.2}Mn_{0.8}O_{1.67}F_{0.33}$ | Fd-3m | 1.66 | 288 |
| EXAMPLE 4 | $Li_{1.2}Mn_{0.8}O_{1.67}F_{0.33}$ | Fd-3m | 1.49 | 277 |
| EXAMPLE 5 | $Li_{1.2}Mn_{0.8}O_{1.8}F_{0.2}$ | Fd-3m | 1.82 | 294 |
| EXAMPLE 6 | $Li_{1.2}Mn_{0.8}O_{1.9}F_{0.1}$ | Fd-3m | 1.75 | 292 |
| EXAMPLE 7 | $Li_{1.2}Mn_{0.75}Al_{0.05}O_{1.67}F_{0.33}$ | Fd-3m | 1.79 | 281 |
| EXAMPLE 8 | $Li_{1.2}Mn_{0.75}P_{0.05}O_{1.67}F_{0.33}$ | Fd-3m | 1.81 | 287 |
| EXAMPLE 9 | $Li_{1.2}Mn_{0.75}Ni_{0.1}O_{1.67}F_{0.33}$ | Fd-3m | 1.71 | 282 |
| EXAMPLE 10 | $Li_{1.2}Mn_{0.75}Co_{0.1}O_{1.67}F_{0.33}$ | Fd-3m | 1.75 | 284 |
| COMPARATIVE EXAMPLE 1 | $Li Mn_2O_4$ | Fd-3m | 0.83 | 140 |
| COMPARATIVE EXAMPLE 2 | $Li_{1.2}Mn_{0.8}O_{1.67}F_{0.33}$ | Fd-3m | 1.12 | 251 |
| COMPARATIVE EXAMPLE 3 | $Li_{1.2}Mn_{0.8}O_{1.9}F_{0.1}$ | Fd-3m | 1.23 | 242 |

As shown in Table 1, the batteries of Examples 1 to 10 have initial discharge capacities of 277 to 300 mAh/g.

That is, the initial discharge capacity of the battery of each of Examples 1 to 10 is larger than the initial discharge capacity of the battery of each of Comparative Examples 1 to 3.

As the reason for this, in the batteries of Examples 1 to 10, the following may be mentioned, that is, the lithium composite oxide included in the positive electrode active material includes F, has a crystalline structure which belongs to the space group Fd-3m, and has an intensity ratio $I_{Mn1}/I_{Mn2}$ of greater than or equal to 1.40 and less than or equal to 1.90. As a result, it is believed that while the stability of the crystalline structure is maintained, the diffusivity of Li is improved. Hence, the initial discharge capacity is believed to be significantly improved.

In Comparative Example 1, the intensity ratio $I_{Mn1}/I_{Mn2}$ is less than 1.40. That is, in Comparative Example 1, the intensity ratio $I_{Mn1}/I_{Mn2}$ is 0.83. Accordingly, since the cation mixing is suppressed, the three-dimensional diffusion path of lithium is believed to be decreased. Furthermore, x/y is small. Accordingly, since the amount of Li to be involved in the reaction is decreased, the diffusivity of Li ions is believed to be decreased. As a result, the initial discharge capacity is believed to be remarkably decreased.

In Comparative Example 2, the intensity ratio $I_{Mn1}/I_{Mn2}$ is less than 1.40. That is, in Comparative Example 2, the intensity ratio $I_{Mn1}/I_{Mn2}$ is 1.12. Accordingly, since the cation mixing is suppressed, the three-dimensional diffusion path of lithium is believed to be decreased. As a result, the initial discharge capacity is believed to be decreased.

In Comparative Example 3, the intensity ratio $I_{Mn1}/I_{Mn2}$ is less than 1.40. That is, in Comparative Example 3, the intensity ratio $I_{Mn1}/I_{Mn2}$ is 1.23. Accordingly, since the cation mixing is suppressed, the three-dimensional diffusion path of lithium is believed to be decreased. As a result, the initial discharge capacity is believed to be decreased.

As shown in Table 1, the initial discharge capacity of the battery of Example 2 is lower than the initial discharge capacity of the battery of Example 1.

As the reason for this, a high intensity ratio $I_{Mn1}/I_{Mn2}$ of Example 2 (that is, an intensity ratio $I_{Mn1}/I_{Mn2}$ of 1.83) as compared to that of Example 1 may be mentioned. Accordingly, since the crystalline structure becomes unstable, the initial discharge capacity is believed to be decreased.

As shown in Table 1, the initial discharge capacity of the battery of Example 3 is lower than the initial discharge capacity of the battery of Example 1.

As the reason for this, a low intensity ratio $I_{Mn1}/I_{Mn2}$ of Example 3 (that is, intensity ratio $I_{Mn1}/I_{Mn2}$ of 1.66) as compared to that of Example 1 may be mentioned. Accordingly, since the cation mixing is suppressed, the three-dimensional diffusion path of lithium is believed to be slightly decreased. As a result, the initial discharge capacity is believed to be decreased.

As shown in Table 1, the initial discharge capacity of the battery of Example 4 is lower than the initial discharge capacity of the battery of Example 3.

As the reason for this, a low intensity ratio $I_{Mn1}/I_{Mn2}$ (that is, intensity ratio $I_{Mn1}/I_{Mn2}$=1.49) of Example 4 as compared to that of Example 3 may be mentioned. Accordingly, since the cation mixing is suppressed, the three-dimensional diffusion path of lithium is believed to be slightly decreased. As a result, the initial discharge capacity is believed to be decreased.

As shown in Table 1, the initial discharge capacity of the battery of Example 5 is lower than the initial discharge capacity of the battery of Example 1.

As the reason for this, a small amount of F of Example 5 as compared to that of Example 1 may be mentioned. As a result, since the amount of oxygen to be involved in the reaction during charge is increased, and oxygen is eliminated during charge, the crystalline structure is believed to be slightly unstabilized.

As shown in Table 1, the initial discharge capacity of the battery of Example 6 is lower than the initial discharge capacity of the battery of Example 5.

As the reason for this, a small amount of F of Example 6 as compared to that of Example 5 may be mentioned. As a result, since the amount of oxygen to be involved in the reaction during charge is increased, and oxygen is eliminated during charge, the crystalline structure is believed to be slightly unstabilized.

As shown in Table 1, the initial discharge capacity of the battery of each of Examples 7 to 10 is lower than the initial discharge capacity of the battery of Example 1.

As the reason for this, in each of Examples 7 to 10, a small amount of Mn which is likely to form a hybrid orbital with oxygen as compared to that of Example 1 may be mentioned. Accordingly, since the contribution of the redox reaction of oxygen is slightly decreased, the initial discharge capacity is believed to be decreased.

As has thus been described, the positive electrode active material of the present disclosure may be used for a battery, such as a secondary battery.

What is claimed is:

1. A positive electrode active material comprising:
a lithium composite oxide which includes:
   Mn; and
   at least one selected from the group consisting of F, Cl, N, and S,
wherein the lithium composite oxide has a crystalline structure which belongs to the space group Fd-3m, and the following formula (I) is satisfied, $$1.40 \leq \text{intensity ratio } I_{Mn1}/I_{Mn2} \leq 1.90 \quad (I)$$

where the intensity ratio $I_{Mn1}/I_{Mn2}$ is a ratio of an intensity $I_{Mn1}$ to an intensity $I_{Mn2}$,
the intensity $I_{Mn1}$ is an intensity of a first proximity peak of the Mn in a radial distribution function of the Mn included in the lithium composite oxide, and
the intensity $I_{Mn2}$ is an intensity of a second proximity peak of the Mn in the radial distribution function of the Mn included in the lithium composite oxide.

2. The positive electrode active material according to claim 1,
wherein the intensity ratio $I_{Mn1}/I_{Mn2}$ is greater than or equal to 1.49 and less than or equal to 1.83.

3. The positive electrode active material according to claim 2,
wherein the intensity ratio $I_{Mn1}/I_{Mn2}$ is greater than or equal to 1.66 and less than or equal to 1.83.

4. The positive electrode active material according to claim 1,
wherein the lithium composite oxide includes F.

5. The positive electrode active material according to claim 1,
wherein the lithium composite oxide is represented by the following chemical formula (I), $$Li_x(Mn_zMe_{1-z})yO_\alpha Q_\beta \quad (I)$$

where Me is at least one selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al,
Q is at least one selected from the group consisting of F, Cl, N, and S,
x is greater than or equal to 1.05 and less than or equal to 1.4,
y is greater than or equal to 0.6 and less than or equal to 0.95,
z is greater than 0 and less than or equal to 1.0,
$\alpha$ is greater than or equal to 1.33 and less than 2, and
$\beta$ is greater than 0 and less than or equal to 0.67.

6. The positive electrode active material according to claim 5,
wherein Me includes at least one selected from the group consisting of Co, Ni, P, and Al.

7. The positive electrode active material according to claim 5,
wherein Q includes F.

8. The positive electrode active material according to claim 5,
wherein z is greater than or equal to 0.875 and less than or equal to 1.0.

9. The positive electrode active material according to claim 8,
wherein z is 1.0.

10. The positive electrode active material according to claim 5,
wherein x is greater than or equal to 1.1 and less than or equal to 1.2, and
y is 0.8.

11. The positive electrode active material according to claim 5,
wherein $\alpha$ is greater than or equal to 1.67 and less than or equal to 1.9, and
$\beta$ is greater than or equal to 0.1 and less than or equal to 0.33.

12. The positive electrode active material according to claim 5,
wherein x/y is greater than or equal to 1.3 and less than or equal to 1.9.

13. The positive electrode active material according to claim 5,
wherein $\alpha/\beta$ is greater than or equal to 5 and less than or equal to 19.

14. The positive electrode active material according to claim 5,
wherein $(x+y)/(\alpha+\beta)$ is greater than or equal to 0.75 and less than or equal to 1.2.

15. The positive electrode active material according to claim 1,
wherein the lithium composite oxide is included as a primary component.

16. A battery comprising:
a positive electrode including the positive electrode active material according to claim 1;
a negative electrode; and
an electrolyte.

17. The battery according to claim 16,
wherein the negative electrode includes at least one selected from the group consisting of:
   (i) a negative electrode active material which occludes and releases lithium ions; and
   (ii) a material from which a lithium metal is dissolved in the electrolyte during discharge and in which the lithium metal is precipitated during charge, and
the electrolyte is a nonaqueous electrolyte.

18. The battery according to claim 16,
wherein the negative electrode includes at least one selected from the group consisting of:
   (i) a negative electrode active material which occludes and releases lithium ions; and
   (ii) a material from which a lithium metal is dissolved in the electrolyte during discharge and in which the lithium metal is precipitated during charge, and
the electrolyte is a solid electrolyte.

19. The positive electrode active material according to claim 5,
where Me is at least one selected from the group consisting of Ni, Fe, Cu, V, Nb, Mo, Ti, Cr, Zr, Zn, Na, K, Ca, Mg, Pt, Au, Ag, Ru, W, B, Si, P, and Al.

* * * * *